(12) United States Patent
Lundberg

(10) Patent No.: US 12,450,674 B2
(45) Date of Patent: Oct. 21, 2025

(54) SYSTEMS AND METHODS FOR ANALYZING PRIOR ART REJECTIONS

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 1006 days.

(21) Appl. No.: 16/366,837

(22) Filed: Mar. 27, 2019

(65) Prior Publication Data

US 2019/0220939 A1 Jul. 18, 2019

Related U.S. Application Data

(63) Continuation of application No. 14/160,430, filed on Jan. 21, 2014, now abandoned.

(51) Int. Cl.
| | |
|---|---|
| *G06Q 50/18* | (2012.01) |
| *G06F 16/3332* | (2025.01) |
| *G06F 16/38* | (2019.01) |
| *G06F 40/14* | (2020.01) |
| *G06F 40/30* | (2020.01) |
| *G06Q 10/00* | (2023.01) |

(52) U.S. Cl.
CPC ....... *G06Q 50/184* (2013.01); *G06F 16/3338* (2019.01); *G06F 16/38* (2019.01); *G06F 40/14* (2020.01); *G06F 40/30* (2020.01); *G06Q 10/00* (2013.01)

(58) Field of Classification Search
CPC ............ G06Q 50/184; G06F 16/3338
See application file for complete search history.

(56) References Cited

U.S. PATENT DOCUMENTS

| | | | |
|---|---|---|---|
| 5,991,751 | A | 11/1999 | Rivette et al. |
| 6,879,990 | B1 | 4/2005 | Boyer et al. |
| 2002/0138473 | A1 | 9/2002 | Whewell et al. |
| 2003/0001873 | A1 | 1/2003 | Garfield et al. |
| 2003/0163492 | A1 | 8/2003 | Slifer |
| 2006/0112084 | A1 | 5/2006 | Mcbeath et al. |
| 2006/0149720 | A1* | 7/2006 | Dehlinger ............ G06F 16/313 707/E17.084 |
| 2007/0073653 | A1* | 3/2007 | Raab ..................... G06Q 10/00 |

(Continued)

FOREIGN PATENT DOCUMENTS

CA 2547301 A1 * 11/2006 ............ G06Q 10/00

OTHER PUBLICATIONS

Microsoft Computer Dictionary, 5 ed (2002) (not cited as prior art) (Year: 2002).*

(Continued)

*Primary Examiner* — Richard W. Crandall
(74) *Attorney, Agent, or Firm* — Schwegman Lundberg & Woessner, P.A.

(57) ABSTRACT

Methods and systems for analyzing office action documents are provided. The method comprises receiving a request for at least one cited reference. The method includes retrieving the at least one cited reference from an index, the index comprising one or more cited references and a rejection type for each of the one or more cited references; and providing the at least one cited reference and the rejection type for each of the one or more cited references.

20 Claims, 11 Drawing Sheets

301B

| US PATENT APP NO. | REJECTION TYPE | OFFICE ACTION DATE | ASSOCIATED CITED REFERENCE APP NO. | ASSOCIATED TEXT |
|---|---|---|---|---|
| 11/247,111 | 102 | 01/01/2009 | 10/222,222 | THE SMITH REFERENCE SHOWS... |
| 11/247,111 | 103 | 06/01/2009 | 10/222,222 | THE SMITH REFERENCE SHOWS... |
| 11/247,111 | 103 | 06/01/2009 | 10/333,333 | THE SMITH REFERENCE SHOWS... |
| 13/111,111 | 102 | 01/01/2011 | 10/222,222 | THE SMITH REFERENCE SHOWS... |

320 / 322 / 323 / 324 / 325 / 324A / 324B / 325A

(56) References Cited

U.S. PATENT DOCUMENTS

| | | | |
|---|---|---|---|
| 2007/0220105 A1* | 9/2007 | Van Luchene | G06Q 30/04 709/217 |
| 2008/0154848 A1* | 6/2008 | Haslam | G06F 16/382 |
| 2009/0150326 A1* | 6/2009 | Sheets | G06N 5/046 706/52 |
| 2010/0131513 A1 | 5/2010 | Lundberg et al. | |
| 2011/0313986 A1 | 12/2011 | Ghosh et al. | |
| 2012/0203791 A1 | 8/2012 | Holt | |
| 2012/0240026 A1 | 9/2012 | Iyer et al. | |
| 2013/0084009 A1 | 4/2013 | Lundberg | |
| 2013/0086070 A1 | 4/2013 | Lundberg | |
| 2013/0132302 A1* | 5/2013 | Lundberg | G06Q 40/06 705/36 R |
| 2013/0290824 A1 | 10/2013 | Lukawski et al. | |
| 2014/0304579 A1 | 10/2014 | Foster et al. | |
| 2015/0206260 A1 | 7/2015 | Lundberg | |
| 2016/0048936 A1 | 2/2016 | Perkowski | |

OTHER PUBLICATIONS

PC Mag Encyclopedia, Doherty Threshold, https://www.pcmag.com/encyclopedia/term/doherty-threshold (not cited as prior art) (Year: 2024).*

WIPO, Topic 1: Patent Landscaping, Mapping, & Analytics, Dec. 4, 2013, available at: < https://www.wipo.int/edocs/mdocs/mdocs/en/wipo_ip_mnl_13/wipo_ip_mnl_13_1.pdf > (Year: 2013).*

U.S. Appl. No. 14/160,430, Final Office Action mailed Feb. 23, 2018, 42 pgs.

U.S. Appl. No. 14/160,430, Non Final Office Action mailed Jul. 18, 2018, 37 pgs.

U.S. Appl. No. 14/160,430, Non Final Office Action mailed Dec. 21, 2016, 15 pgs.

U.S. Appl. No. 14/160,430, Notice of Non-Compliant Amendment mailed Jan. 29, 2019, 3 pgs.

U.S. Appl. No. 14/160,430, Response filed Apr. 21, 2017 to Non Final Office Action mailed Dec. 21, 2016, 14 pgs.

U.S. Appl. No. 14/160,430, Response filed Oct. 18, 2018 to Non Final Office Action mailed Jul. 18, 2018, 12 pgs.

U.S. Appl. No. 14/160,430, Response filed Oct. 31, 2016 to Restriction Requirement mailed Aug. 29, 2016, 6 pgs.

U.S. Appl. No. 14/160,430, Restriction Requirement mailed Aug. 29, 2016, 6 pgs.

* cited by examiner

```
                                                                        ┌─ 301A
                                                                        ▼
┌─────────────────────────────────────────────────────────────────────────┐
│ Application/Control Number: 11/247,111 ─ 320A              Page 6       │
│ Office Action Date: 01/01/2009 ─ 323A                                   │
│                                                                         │
│ Claims 3-16 and 18-31 are rejected for the same reason.                 │
│              *Claim Rejections - 35 USC § 103* ─ 322A               │
│                                                                         │
│ 6.    The following is a quotation of 35 U.S.C. 103(a) which forms the  │
│       basis for all obviousness rejections set forth in this Office     │
│       action:                                                           │
│                                                                         │
│       (a) A patent may not be obtained though the invention is not      │
│       identically disclosed or described as set forth in section 102 of │
│       this title, if the differences between the subject matter sought  │
│       to be patented and the prior art are such that the subject matter │
│       as a whole would have been obvious at the time the invention was  │
│       made to a person having ordinary skill in the art to which said   │
│       subject matter pertains. Patentability shall not be negatived by  │
│       the manner in which the invention was made.                       │
│                                                                         │
│ 7.    Claims 1, 3-7, 9, 14, 16, 18-22, 24, 29, and 31 are rejected      │
│       under 35 U.S.C. 103(a) as being unpatentable over Kasravi (U.S.   │
│       Pub. 20110029476 A1), in view of                                  │
│                                                      ─ 324A             │
│       Adler (U.S. Pub. 20060173920 A1)                                  │
│                        ─ 324B                                           │
│ Claim 1                                                                 │
│ Kasravi discloses a method comprising:                                  │
│                                                                         │
│ .     maintaining a patent matter database, wherein the database    │
│       includes data about the patent matters, the data including    │
│       for at least one patent matter ([0015, line 1-6, "...The      │
│       patent 100 is retrieved from a database, such as the patent       │
│       database maintained by the U.S. Patent and Trademark Office, a    │
│       database maintained by an enterprise such as a company,           │
│       educational organization, government agency, and so forth, or any │
│       other type of database that contains patents...")                 │
│       a claim set or statement of invention ([0021], line 10-12,    │
│       "... the abstract 308, summary 310, background 312, and claims    │
│       314 of the patent 100 contains content that is free form-in other │
│       words..."), and                                                   │
└─────────────────────────────────────────────────────────────────────────┘
                                                                    ─ 325A

| US PATENT APP NO. | REJECTION TYPE | OFFICE ACTION DATE | ASSOCIATED CITED REFERENCE APP NO. | ASSOCIATED TEXT |
|---|---|---|---|---|
| 11/247,111 | 102 | 01/01/2009 | 10/222,222 | THE SMITH REFERENCE SHOWS... |
| 11/247,111 | 103 | 06/01/2009 | 10/222,222 | THE SMITH REFERENCE SHOWS... |
| 11/247,111 | 103 | 06/01/2009 | 10/333,333 | THE SMITH REFERENCE SHOWS... |
| 13/111,111 | 102 | 01/01/2011 | 10/222,222 | THE SMITH REFERENCE SHOWS... |

Enter U.S. Patent Application or Publication Number

⦿ I want analytics with this application being a cited reference.
○ I want the patent office action history for this cited reference.

> Non-Final Office Action
> 08/02/11
>
> Type 102: Claims 1-3, 5-9, 11, and 12 are rejected under 35 U.S.C. 102(a) or 102(e) as being anticipated by US 2007/0218380 A1 (Uchinokura). Uchinokura teaches a toner that is within the compositional limitations recited in the instant claims. See, for example, the toner in example 9 in paragraphs 0323 to 0326 and in Table 2 at page 25. In example 9, the toner comprises toner particles that comprise a styrene-n-butylacrylate binder resin, a saturated polyester resin as "the polarity resin," a colorant, a charge control agent, a releasing agent, and the "laminar inorganic mineral" sold under the tradename CLAYTON APA by Southern Clay Product, Inc. See example 9, paragraph 0324. According to Uchinokura, the CLAYTON APA laminar inorganic mineral is a laminar inorganic mineral in "which part or all of the ions present between layers are modified by" cationic organic ions. Paragraphs 0008 and 0055. The CLAYTON APA laminar inorganic material meets the "layered inorganic mineral in which at least a part of an interlayer ion is replaced with an organic ion" recited in instant claims 1 and 7. In example 9 of Uchinokura, the toner particles are obtained by suspension polymerizing a polymerizable monomer composition dispersed in an aqueous dispersion. The polymerizable monomer composition comprises the monomers styrene and n-butylacrylate, the saturated polyester, the colorant, the charge control agent, the releasing agent, and the laminar inorganic mineral CLAPYTON APA. The Uchinokura suspension polymerization meets the process limitations recited in instant product-by-process claims 1 and 7 According to Uchinokura, the laminar inorganic mineral is preferably present in an amount from 0.05 to 5.0% by weight. Paragraph 00054 and reference claim 6. The Uchinokura laminar inorganic mineral amount meets the amount recited in instant claims 3 and 9. Uchinokura further teaches that the CLAYTON APA laminar inorganic material is locally present near the surface of the toner particles in example 9. Paragraphs 0008, 0036, and 0042, and Table 2 at page 25, example 9. The Uchinokura toner in example 9 meets the limitation of the layered inorganic mineral being "localized near a toner surface" recited in instant claims 2 and 8. Uchinokura teaches that surface localization of the laminar inorganic mineral can be detected by XPS. According to Uchinokura, when the XPS measured surface atomic density (A) of an element, e.g., Al, in the laminar inorganic mineral of the toner is greater than the XPS measured surface atomic density (B) of the element of the laminar inorganic mineral in a composition prepared by mixing and kneading the toner, "the laminar inorganic mineral is localized near the surface of the toner." See paragraphs 0008 and 0042. Table 2 reports that the value of the XPS-measured Al surface atomic density (A) of the CLAYTON APA laminar inorganic material of the toner in example 9

Final Office Action
11/29/11

Type 103: The rejections under 35 U.S.C. 103(a) of claims 1, 3-7, and 9-12 over US 6,635,398 B1 (Komoto) combined with US 7,309,558 B1 (Michel) and of claims 7 and 9-12 over Yoshino combined with Komoto and Michel, set forth in the office action mailed on Aug. 2, 2011, paragraphs 12 and 13, respectively, have been withdrawn in response to the amendments to claims 1 and 7 filed on Nov. 1, 2011, as described supra. None of the cited references teaches or suggests a toner comprising a layered inorganic mineral, "wherein 52-81% of the layered inorganic mineral is localized within 50 nm from a perimeter of the toner" as recited in instant claims 1 and 7.
The disclosure is objected to because of the following informalities:
The use of trademarks, e.g., Claytone APA [sic: CLAYTONE APA] at page 48, line 10, has been noted in this application. The trademarks should be capitalized wherever they appear and be accompanied by the generic terminology. This example is not exhaustive. Applicants should review the entire specification for compliance.
Although the use of trademarks is permissible in patent applications, the proprietary nature of the marks should be respected and every effort made to prevent their use in any manner which might adversely affect their validity as trademarks. Appropriate correction is required.
Applicants' arguments filed on Nov. 1, 2011, have been fully considered but they are not persuasive. Applicants urge that the amendment to the specification filed on Nov. 1, 2011, overcomes the objection. However, for the reasons discussed in the objection above, the amendment to the specification filed on Nov. 1, 2011, did not capitalize all of the trademarks disclosed in the instant specification. Accordingly, the objection stands.

> Notice Of Allowance
> 01/11/12

> Examiner Statements: An examiner's amendment to the record appears below. Should the changes and/or additions be unacceptable to applicant, an amendment may be filed as provided by 37 CFR 1.312. To ensure consideration of such an amendment, it MUST be submitted no later than the payment of the issue fee.
> Authorization for this examiner's amendment was given in a telephone interview with Mr. J. Derek Mason (Reg. No. 35,270) on Jan. 4, 2013.
> The application has been amended as follows:
> At page 50, line 10 and lines 12-13, in each occurrence delete the term "Coulter Counter" and insert the term -- COULTER COUNTER At page 51, line 21; at page 52, lines 3, 7, and 16; at page 53, lines 9 and 19; at page 56, line 3; at page 57, line 8; and at page 59, lines 9, 14, and 20, in each occurrence, delete the term "Claytone" and insert the term -- CLAYTONE --; and
> In the "Amendments to the specification" section filed Sep. 10, 2012, the paragraph beginning at page 52, line 10, at line 2, in each occurrence, delete the term "Claytone" and insert the term -- CLAYTONE
> The examiner's amendment to the instant specification, set forth in paragraph 2 supra capitalizes the trademarks COULTER COUNTER and CLAYTONE to respect the proprietary nature of the marks. Said amendment with the amendment to the specification filed on Dec. 21, 2012, overcomes the objection to the specification set forth in the Final office action mailed on Oct. 26, 2012, paragraph 5.
> The examiner notes that a list entitled "Related case status update" was filed as a "miscellaneous incoming letter" on Dec. 21, 2012. The list is not labeled as an Information Disclosure Statement; it does not comply with 37 CFR 1.97(c) because it lacks a statement as specified in 37 CFR 1.97(e) and the fee set forth in 37 CFR. 1.17(p). Nor does it comply with the provisions of 37 CFR 1.98. Thus, the "miscellaneous letter" of Dec. 21, 2012, appears to serve no useful purpose that advances prosecution or examination of the application. If consideration of any of the information is desired, a proper submission in compliance with 37 CFR 1.97, 1.98, and 1.17 should be provided. The letter has been placed in the application file, but neither the list nor the information referred to therein has been considered.

| REFERENCE CITED TO | NUMBER OF TIMES CITED | 102 REJECTION | 103 REJECTION | DOUBLE PATENTING REJECTION | CITED STRENGTH SCORE | EXAMINER NAME |
|---|---|---|---|---|---|---|
| 11/111,111 | 2 | YES | YES | NO | 2 | BOB |
| 11/111,112 | 3 | NO | YES | YES | 4 | CARL |
| 11/111,113 | 1 | YES | NO | NO | 1 | MARY |
| 11/111,114 | 4 | YES | YES | NO | 5 | SUE |

| REJECTION TYPE | ASSOCIATED TEXT | EXAMINER NAME |
|---|---|---|
| 102 | THE SMITH REFERENCE ANTICIPATES... | BOB |
| 103 | THE SMITH REFERENCE SHOWS... | BOB |

*FIG. 7B*

SYSTEMS AND METHODS FOR ANALYZING PRIOR ART REJECTIONS

CLAIM OF PRIORITY

This application is a continuation of and claims the benefit of priority under 35 U.S.C. § 120 to U.S. patent application Ser. No. 14/160,430, filed on Jan. 21, 2014, which is incorporated by reference herein in its entirety.

BACKGROUND

The management of patent portfolios involves multiple stages of the patent lifecycle. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force. Patent management tools are used by companies and law firms for active patent matters (e.g., unfiled, pending and issued patent matters) as well as inactive patent matters (e.g., expired, abandoned or closed patent matters) to enable users to efficiently manage patent matters throughout the patent lifecycle. During prosecution of an application, there are associated office actions. Those office actions have one or more rejections and, therefore, rejection types. There are four rejections types: 35 USC § 101, 102, 103 and 112. Of those rejection types, 102 and 103 rejections use prior art (material made available to the public before a given date) to emphasize the examiner's arguments. For example, in a 102 rejection, the examiner uses one cited reference to render those claims unpatentable. In a 103 rejection, the examiner generally uses a combination of two or more cited references to render those claims unpatentable. Put another way, cited references are used in 102 and 103 rejections to explain to the applicant why the application's claims are not patentable. The applicant may then respond as to why the cited references are not applicable, do not teach everything the examiner said it does and the like. Again, the examiner has a chance to respond to the applicant's arguments by issuing another office action. This cycle continues until the examiner: 1) determines one or more claims are patentable and allows them or 2) the applicant abandons the application. Since patent professionals have increasingly high caseloads, the ability to quickly analyze the prior art for a given patent application, especially over time, saves time and money when drafting the next office action response. Additionally, the ability to analyze how often a patent has been cited in other patent applications is also valuable information in the patent prosecution process.

BRIEF DESCRIPTION OF DRAWINGS

Some embodiments are illustrated by way of example and not limitation in the figures of the accompanying drawings in which:

FIG. 3A is an illustration of an exemplary office action document, according to an example embodiment.

FIG. 5 is a depiction of a user interface, according to an example embodiment.

FIG. 6A is a depiction of a user interface, according to an example embodiment.

FIG. 6B is a depiction of a user interface, according to an example embodiment.

FIG. 6C is a depiction of a user interface, according to an example embodiment.

FIG. 7A is a depiction of a user interface, according to an example embodiment.

FIG. 7B is a depiction of a user interface, according to an example embodiment.

DETAILED DESCRIPTION

The life cycle of a patent may include multiple stages. These stages generally include harvesting and reviewing inventions, filing patent applications on the inventions, prosecuting the patenting applications to allowance or abandonment, determining whether to file any continuing applications, and paying maintenance fees on the issued patents.

Once a patent application is filed, the patent examination process, also referred to as prosecution, is started. During prosecution, a patent examiner will examine the patent application to determine if the requirements of obtaining a patent are met. The communications between the inventor (or assignee, or representative of the inventor or assignee) and the patent examiner during the examination process is commonly referred to as the prosecution history of the patent application. The prosecution history is memorialized in various writings to create the U.S. Patent and Trademark Office (PTO) file history of the patent application or patent. As PTO communications are received, or responses or other communications filed with the PTO, these patent activities are docketed in a patent management system to track due dates, and corresponding documents and communications are uploaded into the patent management system.

The systems and methods set forth in this specification are described in relation to a patent management system and patent matters, but it will be understood that the present invention could equally be applied to other forms of intellectual property (trademarks, copyright, registered designs, and the like). Moreover, the term "patent" is not intended to be limited to an issued patent, but may include a pending patent application or unfiled application or invention disclosure. The term "user" is intended to cover any person interacting with the patent management system. A user may be an inventor, portfolio manager, business manager, patent attorney, patent paralegal, or patent docketing personnel, for example.

Figure 1:
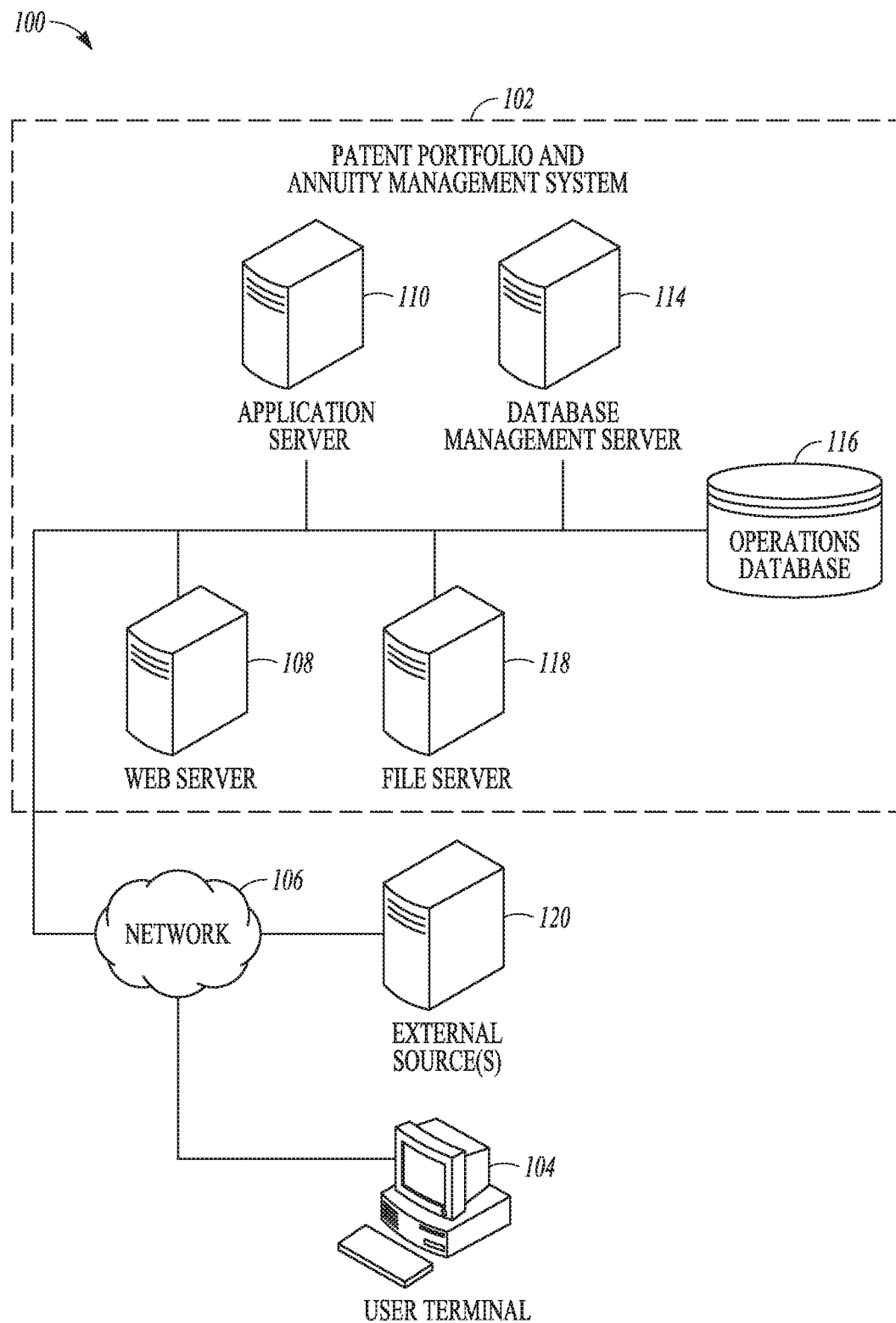
FIG. 1 is a system component diagram, according to an example embodiment.

FIG. 1 is a schematic view of computer network system 100 according to various embodiments. The computer network system 100 includes patent management system 102 and user terminal 104 communicatively coupled via network 106. In an embodiment, patent management system 102 includes web server 108, application server 110, and database management server 114 which may be used to manage at least operations database 116 and file server 118. Patent management system 102 may be implemented as a distributed system, for example one or more elements of the patent management system 102 may be located across a wide-area network (WAN) from other elements of patent management system 102. As another example, a server (e.g., web server 108, file server 118, database management server 114) may represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the software components of patent management system 102. In addition, application server 110 may also provide some or the entire interface for web server 108 to communicate with one or more of the other servers in patent management system 102 (e.g., database management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

User terminal 104 may be a personal computer or mobile device. In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that when viewed as a compilation, represent an "operations database." Sub-databases in such a configuration may include a matter database a portfolio database, a user database, a mapping database and an analytics database. Operations database 116 may be implemented as a relational database, a centralized database, a distributed database, an object oriented database, or a flat database in various embodiments.

In various embodiments, the patent management system framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system or within the patent management system. Thus, a user may see a matter listed as its patent number while internally a database of the patent management system may identify it by a random number.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes and other structures, names, or formats may be used. Additionally, further associations between data stored in the databases may be created as discussed further herein.

During operation of patent management system 102, data from multiple data sources (internal and external) may be imported into or accessed by the operations database 116. Internal sources may include data from the various tools of the patent management system. External sources 120 may include websites or databases associated with foreign and domestic patent offices, assignment databases, WIPO, and INPADOC. In various embodiments, the data is scraped and parsed from the websites. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Figure 2:
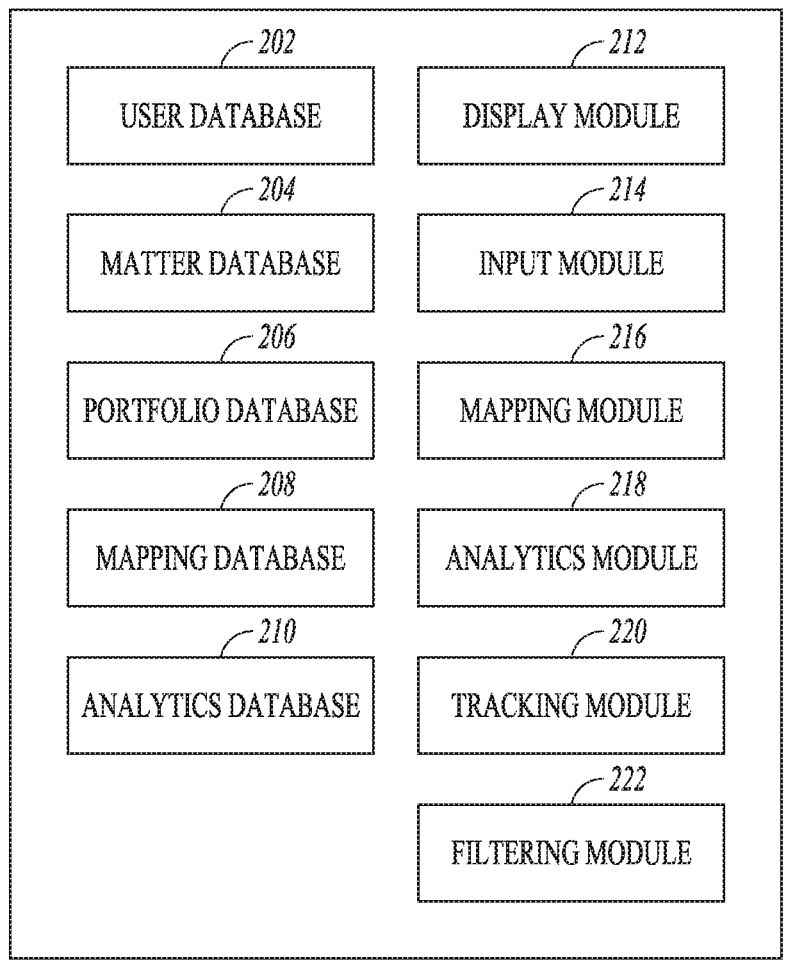
FIG. 2 is a block diagram of a patent management system, according to an example embodiment.

FIG. 2 is a block diagram of patent management system 102, according to an example embodiment. Illustrated are user database 202, matter database 204, portfolio database 206, mapping database 208, analytics database 210, display module 212, input module 214, mapping module 216, analytics module 218, and docketing module 220. In various embodiments, the data stored in databases 202, 204, 206, 208, and 210 may be in the same or multiple physical locations. For example, portfolio database 206 may be stored in one or more computers associated with a portfolio management service. In various embodiments, patent management system 102 mirrors databases stored in other locations. In an embodiment, when a request is made to access data stored in the databases, patent management system 102 determines where the data is located and directs the request to the appropriate location. Similarly, modules 212-220 may be executed across multiple computer systems.

In an embodiment, matter database 204 stores data representing matters as well as file histories, correspondences, and other documents related to patent matters. Each matter may be associated with one or more portfolios. In some embodiments, a matter is associated with no portfolios. In various embodiments, a matter is a foreign or domestic patent or application. Matters may also be inventions that have not yet been filed. In an embodiment, a matter entry includes data fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, and annuity information (e.g., due date, country, and amount due).

More or fewer data fields associated with a patent may be included in a matter entry stored in matter database 204. In an example embodiment, matter database 204 may store a patent matter database, wherein this database includes patent matter data and related documents and communications. In some embodiments, other patent reference documents or prior art in any form may be stored and associated with one or more matters.

Matter database 204 may also store data obtained from internal or external sources relating to cited references owned by or cited against (in "forward" or "reverse" manner) a target entity (for example, a client of a firm) as well as cited references owned by or cited against (in "forward" or "reverse" manner) another entity (for example, a competitor of the client or other target entity). Public bibliographic details of such cited references may be obtainable from websites or databases associated with foreign and domestic patent offices (PAIR), assignment databases, WIPO, and INPADOC. In various embodiments, the data is scraped and parsed from the websites if it is unavailable through a database. The data may be gathered using API calls to the sources when available. The data may be imported and stored in the operations database 116 (of FIG. 1) on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio database 206, in an example embodiment, stores data representing portfolios of one or more matters. Data stored in portfolio database 206 may have been previously generated the patent management system 102. In various embodiments, a portfolio may be generated by a user using patent management system 102. For example, a user interface may be presented to the user requesting a name for the portfolio and identifiers of matters to be included in the portfolio. In an embodiment, a portfolio entry in portfolio database 206 includes the data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 206.

In various embodiments, mapping database 208 may include mappings of patent concepts to one or more matters. In an example embodiment, the underlying patents and patent claims included in each patent portfolio may be categorized by patent concepts (sometimes referred to herein as concepts) such as scope concepts (SC) and technology categories (TC).

In an example embodiment, technology categories are categories that claims relate to, but are not necessarily limited to. For example, a claim to a pulse generator may be put in the technology category "pacemaker", but not be limited to a pacemaker per se—perhaps the claim merely says that the pulse generator generates a pulse of certain type that is useful for pacing, but pacing does not appear in the claim. Hence, the claim relates to the technology category "pacemaker," but it is not limited to being a pacemaker.

In an example embodiment, scope concepts are concepts that a claim is limited to. This is in contrast to technology categories, where the claim may be mapped to a TC but it not necessarily limited to it. A scope concept may be defined in a way to give the concept a context that a user can understand without necessarily having to look at the corresponding claim language. For example, if the scope concept is "method or apparatus for cardiac rhythm management", and it is mapped to claim A, then claim A by definition is limited to this application, such that if a target device does not perform cardiac rhythm management, then it would not infringe claim A.

In an example embodiment, there are two types of scope concepts: 1) high level scope concepts that are like technical categories in the sense they are broad and general and apply to many claims in a portfolio; and 2) scope concepts that are specific to a limited number of claims—for example all claims in a patent may be limited to a very specific distinguishing feature, and this feature could be the basis for a scope concept.

In some example embodiments, high level scope concepts may be defined prior to mapping, and then assigned as applicable. For example, several scope concepts like: atrial pacing, ventricular pacing, defibrillation method or device, etc, may be defined. Then a mapping team may go through all claims in a portfolio and map these scope concepts to claims that are limited to these concepts. After the mapping is complete, an analysis may be done showing how many claims in the portfolio are limited to each of these scope concepts, and the claims may be presented for each SC. This may be useful in disqualifying claims that are not of interest to a particular target (e.g., if an analysis is being done to find a claim that covers an alleged infringer).

In some example embodiments, specific scope concepts are mapped patent by patent or by patent family. These may enable a person to create one or two scope concepts that can be mapped across all claims in a given patent, a family of patents, or across a portion of a patent portfolio. In order to effectively formulate a scope concept that may be globally useful across a patent portfolio, it may be useful to be able to examine multiple patent claims at the same time even if they are not all in the same patent or patent family. A keyword mapping may indicate that there is an exact match between the keyword and a subset of the claim language.

In various embodiments, analytics database 210 stores data representing calculated analytics on data stored within patent management system 102 or external data sources. In various embodiments, analytics are organized according to an individual matter, a portfolio, or family, or date of an event (such as an assignment recordal, for example). Events may be organized by a date range (for example, all assignments occurring between Corporation A and Corporation B in the last 6 months, or all filings made by inventor X in last 12 months). The calculated analytics may be based on information gathered from multiple sources such as databases of patent management system 102 and PAIR.

In various embodiments, information for an individual matter may include status (e.g., disclosure received, drafting, filed, completed-waiting examination, in prosecution, allowed, issued), cited prior art, list and type of rejections (e.g., 35 U.S.C. § 101, 102, 103), number of claims allowed, office action count, interviews held, IDS statements filed, attorney fees to date, and PTO fees to date. Further metrics for an individual matter stored in analytics database 210 may include time waiting for examiner, total time in examination, time waiting for PTO while in examination, and time on appeal. Additional prosecution details may include an upcoming docket date (e.g., due dates for office action, IDS due dates, etc.), number of claim amendments, number of declarations, number of interviews with examiner, number of continuations (CONs), divisionals (DIVs), and RCE's, and standard deviations from mean (e.g., within classification). A claim prosecution history chart (see FIG. 6) may also be stored in analytics database 210 for each matter. The prosecution history may include a history of claim amendments and arguments made in prosecution. Claim information may also be stored in analytics database 210 including number for each claim type (e.g., compound, method of manufacturing, method of medical use, composition, etc.), number of independent claims, number of dependent claims, length (e.g., word count) of independent and dependent claims, and standard deviations from mean (e.g., within classification) for previous. In addition, patent document information may be stored in analytics database 210 including number of backwards citations of foreign patents (especially PCT and EP), number of backwards citations of non-patent references, existence of foreign equivalents (same subject matter prosecuted in another country, and thus examined by another examiner/patent office), and standard deviations from mean (e.g., within classification) for previously mentioned.

In various embodiments, portfolio and family analytics information may be stored in analytics database 210 based on aggregating the metrics for an individual matter. In an embodiment, the analytics of a family may differ from those in a portfolio as not all family member matters may be part of a portfolio. Additionally, the analytics may be stored for multiple time periods such that comparisons may be made between current metrics and metrics from a year ago (or other time period).

Aggregated metrics may include total patents and applications, pending and waiting for examination, in prosecution with no claims allowed, in prosecution with some claims allowed, appealed, notice of allowance received, and issued. These metrics may be compiled for both US and international matters in the portfolio. Additional information may include the international portfolio distribution by country. An age distribution of the portfolio may also be compiled. For example the portfolio may be broken down by less than one year old, 1 to 3 years old, 3 to 5 years old, 5 to 10 years old, 10 to 20 years old, and 20 or more years old. Recent filing and issue activity as well as upcoming Ford filing deadlines may be stored in analytics database 210.

In various embodiments, prosecution metrics across a portfolio or family are determined and stored in analytics database 210. This data may include matters waiting for examination, matters in examination, matters appealed, and cases allowed but not yet issued. Analytics with respect to office actions may also be compiled and stored. For example, success of allowance after a first office action response, a second response, and so forth may be stored in analytics database 210. Additional prosecution analytics may include allowance rate (e.g., 10%) after a telephone interview, allowance after an in-person interview, percentage of interviews with response, number and type of rejection, average time in prosecution (e.g., in months), average time to file a response, and average time to next office action. Further, the list of recently allowed cases, recently appealed cases, stalled cases, and recently abandoned cases may also be stored for each portfolio and family in analytics database 210.

In various embodiments, the results of keyword analysis on one or more matters and/or prior art references may be stored in analytics database 210. The keyword analysis may be based on the occurrences of the keywords in the matter or references to derive a score or keyword overlap.

In various embodiments, data stored in the analytics database 210 for a group of matters in a portfolio or family is analyzed to determine the top (e.g., ten) most cited patents, the top most cited inventors, top most cited prior art owners (e.g., according to assignment documents or the face of the patent), newly (e.g., within the last 60 days) cited prior art owners, and top most cited prior art inventors. This information may be stored in analytics database 210.

In an embodiment, display module 212 is configured to display user interfaces and information retrieved from one or more databases 202-210. If a user is accessing patent management system 102 remotely (e.g., through a web browser), display module 212, representing a user-interface through a network to a user terminal, may be configured to transmit data. In various embodiments, display module 212 is to generate one or more charts of data stored in databases 202-210. For example, display module 212 may generate a pie chart of the top 10 inventors within a portfolio. In various embodiments, display module 212 may present a patent search interface, as shown in FIG. 5; a claim prosecution history chart, as shown in FIG. 6; analytics related to a given application being a cited reference, as shown in FIG. 7A; and more detailed analytics, as shown in FIG. 7B. Furthermore, data may be entered, through input module 214, into the user interface fields shown in FIGS. 5-7B.

In various embodiments, input module 214 receives data from multiple sources where it may be further processed by one or more other modules and stored in one or more of databases 202-210. In various embodiments, input module 214 of the patent management system 102 may comprise a search engine (not shown) for conducting searches at a patent registry or on the Internet. For example, input module 214 may be configured to utilize one or more APIs to data from one or more patent data stores (e.g., public PAIR, private PAIR, INPADOC, foreign patent offices, patent docketing systems, portfolio management systems, etc.). The data may include published patent documents, patent applications, office actions or other patent office correspondences, prior art references, dockets dates, annuity payment data and patent or patent application assignment information. Specific assignment data may include details pertaining to the assignor or assignee (e.g. name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is configured to receive input from one or more user interface elements. For example patent management system 102 may present multiple user interfaces to a user. These user interfaces may enable users to input data directly into databases 202-210, instruct the patent management system to retrieve data from patent data stores, and instruct the patent management system to perform various operations (e.g., analysis) on the data in databases 202-210.

Additionally, input module 214 may be configured to determine the selection of one or more user interface elements by a user and initiate the action associated with the selected user interface element. For example, a user interface element may include a text box wherein a user can populate a patent application. Input module 214 may be configured to receive the request for the inputted patent application. Then, input module 214 may pass the request to one or more other modules for further processing. For example, display module 212 may render a new page with the results from the request for a patent application.

In various embodiments, input module 214 processes the data that has been inputted and formats it according to the data fields of databases 202-210 as discussed above. In various embodiments processing is completed using a parsing module (not shown). For example, consider a patent publication that a user has directed to be inputted into one or more of the databases. The parsing module may use a combination of automatic image recognition and text analysis to determine the filing date, issue date, title, abstract, and claims of the patent. In some embodiments, the parsing module may flag certain pieces of data that had been determined to be potentially inaccurate (e.g., a number could not be read). A user of patent management system 102 may then examine the flagged data and manually enter the information which is then stored in the appropriate database.

The resulting data that has been parsed by the parsing module may then be entered as an entry in one or more of databases 202-210. This may be accomplished by, for example, formulating an insert SQL query with the parsed information. In various embodiments the parsing module may parse multiple pieces of information before generating a database entry. For example, input module 214 may receive an office action document for a pending application. The office action document date may be combined with the information parsed from the pending application to form an entry in matter database 204.

In various embodiments, mapping module 216 is to facilitate mappings of scope concept, technology categories, prior art and keywords to patent claims of a matter. In an embodiment, mapping signifies association. For example, in conjunction with display module 212 and input module 214, mapping module 216 may present a user interface of patent claims stored in matter database 204 and scope concepts stored in mapping database 208. Input module 214 may receive a selection of one or more patent claims and one or more scope concepts and pass them to mapping module 216. Mapping module 216 may then formulate an SQL query to associate the one or more patents claims with the one or more scope concepts. When executed, the SQL query may update the mapping database 208 with the associations. In various embodiments, mapping module 216 also allows the creation of new scope concepts, technology categories, and keywords that may be mapped to one or more patent claims. Furthermore, mapping module 216 may present user interfaces that allow a user to rank and rate matters stored in matter database 204.

Mapping module 216 may also allow the generation of claim charts of a plurality of cells. A claim chart may include one or more scope concepts, technology categories, and keywords on one axis and claims of matters in a portfolio on the other axis. The claim chart may include a variety of levels of granularity of scope concepts. Some claims may be mapped to all of the scope concepts while others may not be mapped to any scope concepts. At the cell intersection between a scope concept (or technology category or keyword) and a claim, an indication of the mapping may be presented by changing the format of the cell. For example, the cell may be colored blue when a scope concept is mapped and red when not mapped.

In various embodiments, analytics module 218 is to examine and run calculations on the data stored in the databases 202-210 to generate the analytics previously discussed. For example, analytics module 218 may formulate an SQL query that retrieves the number of times that a prior art reference has been cited within a portfolio. This query may be run for each prior art cited within the portfolio to determine a list of the most cited (e.g., the top ten) prior art references with a portfolio. In an embodiment, the queries are formulated and run as requested by a user. In an embodiment, once the analytics information has been determined, it is stored within analytics database 210. In various embodiments, queries are formulated and run on a periodic basis (e.g., nightly) and entries in analytics database 210 may be updated to reflect any changes. In other embodiments, the analytics module 218 may in response to user input formulate a query to examine how many times a given patent matter has been assigned or been subject to a change in ownership from one party to another. Other queries analyzing patent assignment data may be run as requested by a user.

In various embodiments, the analytics module 218 is to analyze and map cited reference data stored in the matter database 204. The data may be scraped in by the input module 214. For example, cited references owned by or cited against target or other entities as mentioned above may be mapped against each other to determine a "prior art" overlap. The overlap may be presented graphically, for example in a graphic user interface presented in user terminal 104. In various embodiments, the overlap may relate to so-called "forward" citations, or "reverse" citations, or both. In various embodiments, the overlap may be presented for a target company and one or more competitors. Changes in the overlap over time may also be stored and mapped to give an indication to a user of technology trends, changes in trends and the ongoing development of potentially relevant prior art. In various embodiments, a prior art overlap between a target and competitor may be stored, mapped and shown for a single patent, a portfolio of patents, or a family of patents. The target and other entities of interest, such as competitor companies or inventors, may be selected by the user.

An analytical result or mapping may be displayed as a list of prior art cited against both the target and competitor, with an indication of which art overlaps or is common to both listings. In various embodiments, the analytical result or mapping may in addition or alternatively present a list of companies that own the prior art cited against the target and other entities. The target company may appear as an owner. The display module 212 may be to display the results of the mappings and overlap of cited references as a bar chart, or listings, or other graphic, in a user interface.

In various embodiments, the analytics module 218 is to receive input identifying a pool of keywords for a first patent matter in matter database 204 and associated prior art documents in matter database 204. The term keyword is intended to include individual keywords as well as a number of keywords grouped together making up a key phrase, for example. The analytics module 218 may be further to perform a keyword analysis on the first patent matter and associated prior art documents based on occurrences of the keywords in the first patent matter and associated prior art documents. The analytics module 218 may be further to identify, based on the analysis, keywords occurring uniquely in the first patent matter. In view of their uniquely occurring nature, these keywords may be regarded as claim elements potentially differentiating the claim set or statement of invention over the disclosures contained in the one or more prior art documents.

In various embodiments, the analytics module 218 is to generate for a user the patent activity profiles of one or more entities. The entities may be competitive entities to the user, or the user's employer or client. The generated activity profiles may form part of the information to assist in strategic monitoring of patent portfolios. A patent activity profile may be built for a particular patent applicant or owner, or a type of owner, and then deviances from that profile may be flagged. The profile may include foreign filing patterns, US filing patterns—for example, does the owner typically file a provisional application first, followed by a PCT application, or is a US application typically filed thereafter? The profile may include information about abandonments—for example, what subject matter does an owner give up on or surrender during prosecution, or in making abandonment decisions? In various embodiments, the profile may include information about instances or circumstances in which an owner does not pay a patent annuity or renewal fee. The profile may include any of the data stored in analytics database 210 referred to above. Analytics module 218 may be to flag deviances from a profile and send update alerts to a user accordingly. For example, in conjunction with display module 212 and input module 214, analytics module 218 may present to a user an interface indicating one or more patent activity profiles for one or more patent owners for the user to select and review.

The tracking module 220, according to an example embodiment, maintains information related to a specific patent, group of patents, or concept. For example, the tracking module 220 may store information related to a patent's prosecution and litigation history (such as office actions or claim amendments). In other example embodiments, the tracking module 220 may store information relating to the assignment of patent applications or patents from one assignee to another, or from an inventor to employer assignee, for example. Information of this nature may be stored by tracking module 220 for defined sets of applications or patents registered in a specified name, and within certain date ranges, for example. Update alerts (e.g., electronic mail, SMS, or similar) may be sent to a user indicating a change in ownership for a patent or patent application.

In various embodiments, the filtering module 222 is to filter a set of matters according to a user preference. For example, a user may activate a check box that indicates only pending matters should be shown in a user interface. Filtering module 222 may formulate an assignment query consistent with retrieving only pending matters. The results of the query (or any query) may then be shared with display module 212 where the user interface may be updated. The regular alerts may in other example embodiments be pushed to a user terminal 104, an external website, an intranet site, a PDA, smart phone, or other similar handheld device.

In various embodiments, a patent management system 102 may be provided for automatically monitoring developments in a field of prior art. The system 102 may comprise a database for maintaining an ontology of patent concepts of the type described above, and an input module 214 for receiving a search query including a first patent concept related to the field of prior art to be monitored. In an example embodiment, a search engine (not shown) may be provided and to search the Internet as a function of the search query and generate a first set of search results. The search engine may be further to run a second search, as a function of the same search query, on a subsequent occasion to generate a second set of search results. The analytics module 218 may be to compare the first and second sets of search results to identify differences in the results, and the display module 212 may be to communicate the differences in the search results to a user.

The system 102 may further comprising a patent matter database (e.g., matter database 204) wherein the database includes data about the patent matters and the data including a claim set for at least one patent matter, and wherein the first patent concept relates to at least one feature of the claim set. In one example embodiment, the input module 214 may be further to receive the search query including the first patent concept from a user who may select at least one patent concept from the stored ontology or provide a new patent concept. In another example embodiment, the mapping module 216 may be to automatically provide the search query including the first patent concept to the input module 214, and may be further to automatically select at least one patent concept from the stored ontology. The first patent concept may include at least one keyword, for example at least one keyword present in the claim set. In an example embodiment, the first patent concept may include at least one scope concept, for example at least one scope concept present in the claim set.

In various embodiments, the search engine and modules 212, 214 and 216 may be further to perform the searches, compare the results, and communicate the differences in the first and second search results automatically to a user on a predetermined regular basis thereby to notify the user of any intervening changes in the field of prior art.

In various embodiments, the system 102 may at least partly be hosted on an interactive website such that the search query can be received from the user, and the search results can be communicated to the user, via one or more web pages hosted on the website. The system 102 may further comprise a web-based search engine for searching the Internet. In an example embodiment, the display module 212 may be to communicate the differences in the search results to the user in a handheld or mobile device.

In various embodiments, a patent management system 102 may be provided comprising a network; a database accessible on the network and including data relating to a field of prior art; and a server, operatively connected to the network, wherein the server includes a processor, a memory, software operable on the processor to: maintain an ontology of patent concepts; receive a search query including a first patent concept related to the field of prior art; search the database as a function of the search query; generate a first set of search results; store the first set of search results in a database; conduct a subsequent search of the database as a function of the search query; generate a second set of search results; compare the first and second sets of search results to identify differences in the results; and communicate the differences to a user.

In various embodiments, a system 102 may be provided for analyzing prior art, the system 102 comprising at least one hardware-implemented module (for example, input module 214 or other modules in modules 212-222) to identify a first set of cited references cited against a target entity, and at least a second set of cited references cited against at least one other entity; an analytics module 218 to map the first set of references against the at least second set of references to determine a prior art overlap of references common to both or all sets; and a display module 212 to configure for display a representation of the prior art overlap to a user.

The one or more hardware-implemented modules 212-222 may be to identify the owners of the first and at least second sets of cited references. The display module 212 may be to configure for display the prior art overlap to the user and include details of the identified owners of the first and at least second sets of cited references.

The at least one hardware-implemented module 212-222 may be to receive input from a user identifying the target entity and at least one competitor of the target entity as the at least one other entity.

In various embodiments, the display module 212 may be to configure for display a representation of the prior art overlap and include a bar chart within the representation. The display module 212 may be to configure for display a listing of the cited references common to both or all sets of cited references within the representation. The display module 212 may be to configure for display a listing of the owners of the cited references common to both or all sets of cited references within the representation. The display module 212 may be to configure for display the representation of the prior art overlap in a handheld user interface.

The first and at least second set of cited references may include reverse citations. The first and at least second set of cited references may include forward citations.

In various embodiments, a system 102 may be provided for analyzing prior art, the system 102 comprising a network; at least one database accessible on the network and including data relating to cited references; and a server, operatively connected to the network, wherein the server includes: a processor, a memory, software operable on the processor to identify a first set of cited references cited against a target entity, identify at least a second set of cited references cited against at least one other entity, map the first set of references against the at least second set of references to determine a prior art overlap of references common to both or all sets, and communicate a representation of the prior art overlap to a user.

The software may be further operable to identify the owners of the first and at least second sets of cited references. The software may be yet further operable to communicate the prior art overlap to the user and include details of the identified owners of the first and at least second sets of cited references. The software may still further be operable to communicate a representation of the prior art overlap to the user, the representation including elements selected from the group comprising: a bar chart, a list of cited references, one or more forward citations, one or more reverse citations, and owners of the cited references.

Some embodiments of the present inventive subject matter include methods for aspects of patent management. Block diagrams of such methods are shown in FIGS. 3 and 4.

Figure 3:
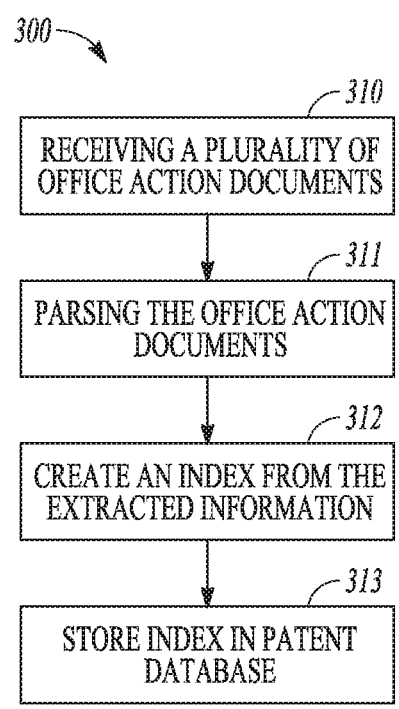
FIG. 3 is a block diagram showing one method of analyzing prior art documents, according to example embodiments.
Figures 3B, 4:
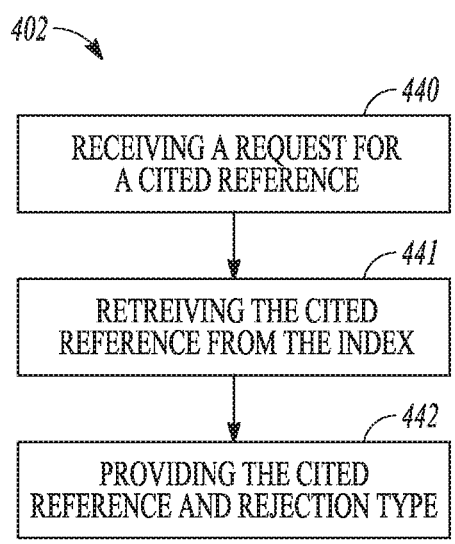
FIG. 3B is an exemplary index, according to an example embodiment.
FIG. 4 is a block diagram showing one method of analyzing prior art documents, according to example embodiments.

FIGS. 3 and 4 illustrate methods of analyzing office action documents. In these exemplary methods 300 and 400, the focus is only on one patent application and its associated office actions. One skilled in the art would appreciate that several patent applications and their associated office actions could also utilize the exemplary methods 300 and 400 explained below. Each method is described herein. In FIG. 3, beginning at block 310, a plurality of office action documents related to a patent application are received. The office action documents may come in various forms. For example, a given office action document may be in XML® format with associated tags indicating the rejection types, the cited references and the text associated with each rejection type. In other embodiments, the office action document may be an image. Therefore, the document would have to be processed through a character recognition program (e.g., Optical Character Recognition (OCR)) before parsing can occur.

Once the document has been received, at block 311, parsing can begin at the parsing module. If the document is in a readable format such as XML®, then the parsing module may expediently parse and extract the necessary information. If, however, the document needs additional steps like character recognition, then further steps may need to occur to ultimately index the document. For instance, after character recognition, the document may now need software/programs to: 1) determine the physical locations of the rejection types and the cited references within the document; 2) tag the document with rejection types and cited references; and 3) tag the text associated with the rejection types. Other steps may include determining the given patent application number and the patent owner. Some or all of these steps need to be done before and/or simultaneously with parsing. Either way, the parsing module ultimately parses each office action document and extracts the rejection type, cited reference and associated text. After extraction, the extracted information is used to create an index, at block 312, and the index is stored, at block 313, in a patent database. The cycle of receiving office action documents, parsing and extracting information happens until a large enough index is created from which a user can search.

An exemplary office action document 301A and index 301B is shown in FIGS. 3A-3B. While this illustrates one embodiment of an index, one skilled in the art would appreciate that the implementation index may have more or less fields depending on the system's design and architecture. The exemplary office action document 301A shown has a patent application field 320A, a rejection type field 322A, an office action date field 323A, an associated cited references fields 324A, 324B and an associated textual field 325A. Each are described herein. The patent application field 320A represents the serial number for which an office action document has been received. The rejection type field 322A represents the one or more types of rejections that occurred in a particular office action document. For instance, a rejection type may be 35 USC § 102, 103 or obviousness type double patenting or the rejection type is shorten to just "102," "103" or "OTDP," respectively. The office action date field 323A represents the date in which the office action was mailed to the applicant. The associated cited references fields 324A and 324B represent the two cited references that were used in this particular office action document. For example, an office action document has a 102 rejection type. Related to that 102 rejection is the cited reference U.S. Pat. No. 5,412,745, which in turn, is one cited reference field for the office action document. An associated textual field 325A represents the text within the office action document that corresponds to the given rejection type. Continuing from the previous example, within the 102 rejection section, the examiner first lists the cited reference he/she is asserting (U.S. Pat. No. 5,412,745). Then the examiner writes his/her arguments for why the cited reference anticipates the application. These arguments would be considered associated text for the 102 rejection on the office action document. In the exemplary index 301B, each identified field in the office action document 301A is extracted and placed into its corresponding column within the index. For example, the patent application field 323A (from FIG. 3A) is populated into the U.S. Patent App No column 320. The rejection type field 322A (from FIG. 3A) is populated into the Rejection Type column 322. The office action date field 323A (from FIG. 3A) is populated into the Office Action Date column 323. The associated cited references fields 324A and 324B (from FIG. 3A) are populated into the Associated Cited Reference App No column 324. The associated textual field 325A (from FIG. 3A) is populated into the Associated Text column 325. While not shown, other fields may also be included in the index such as a patent family identifier field, office action document field, current patent owner, art unit, bibliographic information and the like. For instance, the office action document field would represent a unique identifier that allows the system to recall the particular office action document.

FIG. 4 illustrates a method of analyzing office action documents, according to one embodiment. A method 402 for analyzing office action documents comprises: at block 440, receiving a request for at least one cited reference; at block 441, retrieving the at least one cited reference from an index, the index comprising one or more cited references and a rejection type for each of the one or more cited references; at block 442, providing the at least one cited reference and the rejection type for each of the one or more cited references. Since the index includes the cited references and rejection type, a user can search by the cited reference to see all the associated rejection types. In addition, the index also allows the user to see how many applications' file histories have mentioned the cited reference. Furthermore, the user could also search by a patent application and the display would render all the cited references within that application's file history.

Reference is now made to FIGS. 5-7B, which show user interfaces that may be used to present patent information to the user in the patent management system 102, according to exemplary embodiments. The user interfaces may be displayed by display module 212 as described above. The user interface may be provided in a website, computer monitor, or mobile device. The type of user elements, names, and layout depicted in FIGS. 5-7B are intended to be an illustration of an example user interface of patent management system 102. Other types of user elements, names, and layouts may be used.

User interfaces illustrated in FIGS. 5-7B include multiple user interface elements. In an example embodiment, a user interface element is a graphical or textual element that a user may interact with to cause an application to perform an assigned action for the interface element. Data representing the user interfaces illustrated in FIGS. 5-7B may be transmitted via network 106 and presented on a display of user terminal 104 through the use of a web browser. A user (e.g., patent docketing personnel, patent paralegal, etc.) may interact with the user interface elements of the user interface through the use of an input device (e.g., stylus, cursor, mouse, and a finger) of the user terminal. In an embodiment, a user selection is based on the coordinates of the input device as it makes contact with the display or where a user "clicks" the mouse. The coordinates are compared to the coordinates of the user input element to determine the selection. The type of user elements, names, and layout depicted in FIGS. 5-7B are intended to be an illustration of an example user interface of patent management system 102. Other types of user elements, names, and layouts may be used. Some elements may be omitted in various embodiments depending on the nature of management tool provided.

FIG. 5 illustrates a user interface 500 for searching cited references, according to an example embodiment. The user interface 500 includes a search text box whereby a user can input one or more U.S. patent, application, or publication numbers. In addition, the user selects an output based on which use case the user prefers. For instance, if a user wants to view the patent office action claim history for the particular application, a claim prosecution history chart allows the user to see all of the cited references, text and rejection types throughout the prosecution history of the searched application. An exemplary claim prosecution history chart is illustrated in FIG. 6. In another example, if the user wants to know the analytics related to the application being a cited reference, a cited references analytics page allows the user to see all the information regarding every time the searched application was used as a cited reference. Exemplary cited references analytics pages are illustrated in FIGS. 7A-7B.

FIGS. 6A-C illustrate a user interfaces for presenting a claim prosecution history chart 600 for a searched patent application. The chart 600 may be provided as a Microsoft® Excel® spreadsheet but given the limited space, each column has been presented as a different illustration. As shown by these user interfaces, there are three office action activities for this patent application. The office action activities include: Non-Final Office Action dated Aug. 2, 2011 (FIG. 6A), Final Office Action dated Nov. 19, 2011 (FIG. 6B) and a Notice of Allowance dated Jan. 1, 2012 (FIG. 6C). Each office action activity would have a corresponding office action document whereby this information was parsed, extracted and stored within an index for efficient retrieval. From the Non-Final Office Action in FIG. 6A, there was a 102 rejection using the Uchinokura publication as a cited reference. Displayed below the rejection type and associated cited reference is the text of the examiner's argument. This allows a user to quickly and efficiently understand the examiner's arguments across all the office actions to see the progression of the examination. In the Final Office Action in FIG. 6B, there was a 103 rejection that was ultimately withdrawn but the cited references were to the Komoto and Michel patents. Finally, the Notice of Allowance in FIG. 6C includes the examiner's reasons as to why the application is allowed. Presenting this information in a chronological way is beneficial to a user who may be looking at the prosecution history of the given application for the first time. This reduces the time considerably when compared to looking up each office action individually to determine the examiner's arguments. Additional embodiments also include the applicant's responses along with other prosecution activities such as appeals, advisory action, restrictions, etc. (not shown). However, FIGS. 6A-C were abbreviated to illustrate the chronological aspect of the output not to limit the display.

FIG. 7A illustrates a user interface 700A for presenting analytics related to a given application being a cited reference, according to an example embodiment. The user interface 700A includes information regarding the forward citation number, the number of times the reference was cited with respect to the application, the 102, 103 or double patenting rejection determination, the dominance score and/or the examiner name. Each are described herein. Forward citation number identifies which applications have cited the searched reference as a cited reference. For example, if a user searches for application Ser. No. 10/111,111 in the search interface 500 and selects "I want analytics with this application being a cited reference," user interface 700A would be displayed whereby the user could see that four applications had application Ser. No. 10/111,111 as a cited reference. In some embodiments, this number may be hyperlinked whereby the user can engage the hyperlink to be navigated to that application's claim prosecution history chart, refer back to FIG. 6. The number of times cited refers to how many times the given application was cited in a particular application. For example, the examiner may use the same reference several times in multiple office actions as the examiner is not always persuaded by applicant's arguments. The number of times cited also comes into play when determining the dominance score discussed later. In some embodiments, this number may be hyperlinked whereby the user can engage the hyperlink to be navigated to more details about the office actions, see FIG. 7B. The 102, 103 and double patenting rejection columns help the user identify for which rejections the searched reference was used. The dominance score is a determination of a cited reference's prominence with respect to examination. For example, if a cited reference was only cited once in one application, the dominance score may be minimal. However, if the cited reference has been used over 100 times and always as 102 rejections, the dominance score may be higher. Factors in determining a dominance score may include but are not limited to:

Number of times cited in one application
Total number of times cited in all applications
Rejection Type
Art Unit
Examiner Name
Earliest office action date where reference was cited
Latest office action date where reference was cited
Status of cited reference A dominance score may be with respect to a particular application or it may be an overall dominance score regardless of applications. For instance, in FIG. 7A, the dominance score refers to how prevailing the cited reference is to the forward citation application. Whereas, there could also be an overall dominance score (not shown) which would take into account all the forward citation applications for a searched reference when determining the prominence. The examiner name refers to the examiner that examined the forward citation applications, not the searched application. This helps identify if any examiner uses a piece of art excessively.

In some embodiments (not shown), there are faceting and/or filtering techniques to help the user drill down to the information that is most beneficial to him/her. While in the current embodiment, the results were sorted by application number, one skilled in the art would appreciate other ways of displaying, sorting and/or ranking the information. For example, results with a higher dominance score may be ranked higher than those with lower score. Thus, the results are displayed in descending order with the highest ranked dominance score being first.

FIG. 7B illustrates a user interface 700B for selecting a "# of Times Cited" link from the previous FIG. 7A. In this instance, the user selected the hyperlinked "2" in order to see more details around the two cited reference instances. In user interface 700B, the rejection type, the associated text and the examiner name are all displayed for the user. One of ordinary skill in the art would appreciate other details regarding the rejections may also be displayed in this interface.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
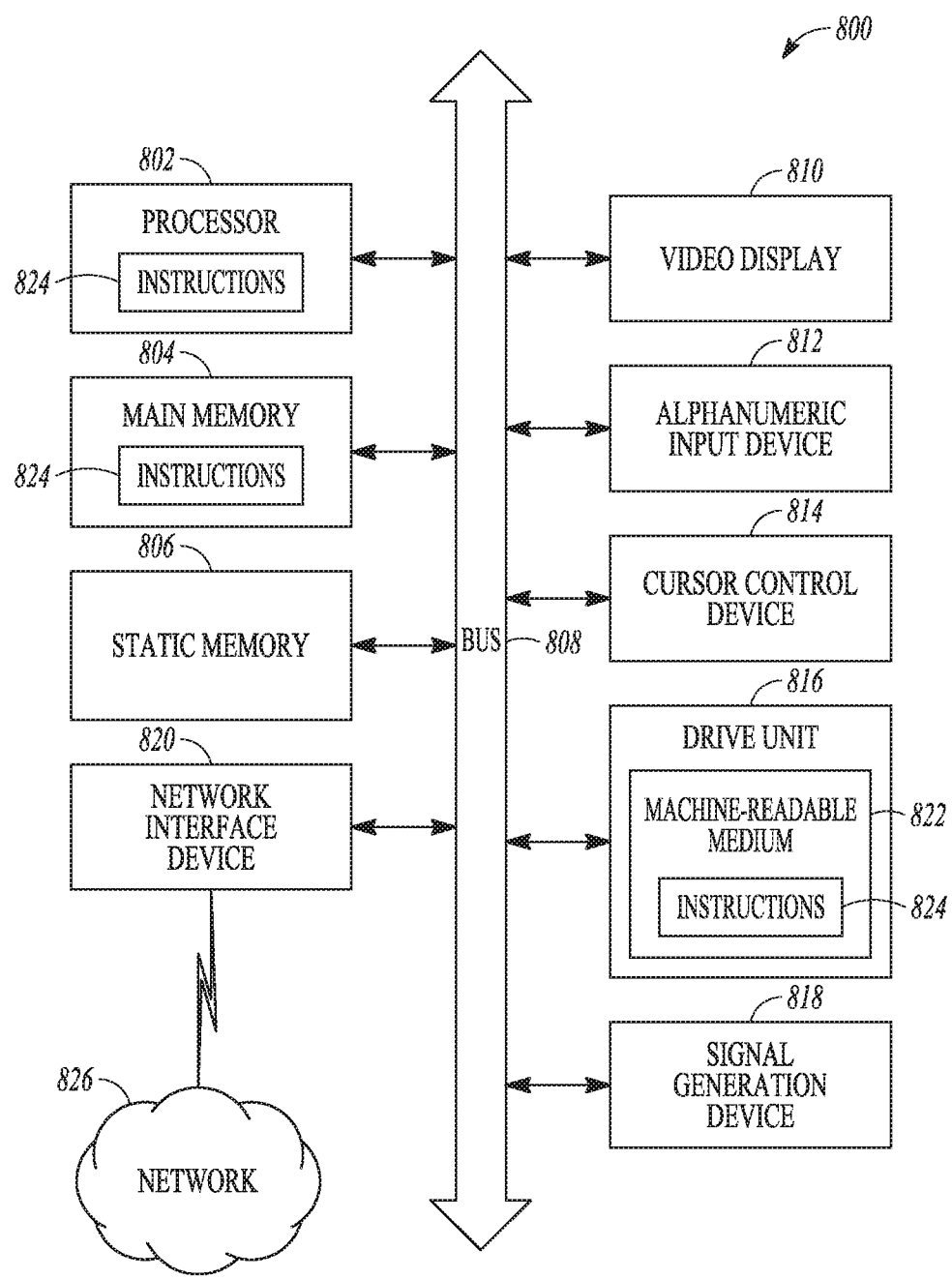
FIG. 8 is a block diagram of machine in the example form of a computer system within which a set of instructions, for causing the machine to perform any one or more of the methodologies herein discussed, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top block (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

NOTE ON THE ABSTRACT

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of analyzing office action documents, the method comprising:
   receiving an identification for a patent application contained in a patent database, the identification of the patent application provided by a user through a user interface;
   automatically formulating a search query to search an index of the patent database for references cited in office action documents for the patent application, wherein the search query is generated in a database readable language and formulated using automatic extraction of keywords included in at least one claim of the patent application, the index including a set of references cited in office action documents against a set of patent applications, and the index further indicating a rejection type for each respective reference in the set of references as cited against a respective patent application of the set of patent applications;
   in response to receipt of results from the search query, adding the references cited in office action documents for the patent application to a reference set;
   automatically formulating a second search query as a function of the search query, the second search query querying the index using a subset of references of the reference set having a rejection type, wherein the second search query incorporates a real-time analysis of historical data patterns and trends associated with the rejection types, utilizing a mapping module configured to dynamically correlate specific rejection types with corresponding patent applications and prosecution outcomes through bidirectional data exchange with an analytics database that maintains temporal rejection pattern data;

issuing the second search query against the index of the patent database to return, as query results, additional patent applications with office action documents where the subset of references of the reference set have been cited based on the rejection type, wherein search parameters of the second search query are continuously updated and refined in real-time based on live data inputs and the historical data patterns stored in the analytics database through automated feedback loops between the mapping module and analytics database;

adding references found in the office action documents for the additional patent applications to the reference set by automatically inserting an application number for each additional patent application of the additional patent applications associated with an office action document of the office action documents where a reference of the references is cited for the rejection type to a structured data record field for the patent application, wherein the structured data record field maintains relational linkages between rejection types and associated references;

performing a keyword analysis for the patent application and references in the reference set based on occurrences of the keywords in the patent application and references in the reference set;

identifying, as unique keywords, keywords occurring uniquely in the patent application; and presenting, in the user interface, the unique keywords.

2. The method of claim 1, wherein the index further comprises text corresponding to the rejection type.

3. The method of claim 1, further comprising:
filtering the reference set by the rejection type, wherein filtering further comprises providing a reference set of filtered cited references.

4. The method of claim 3, wherein the set of filtered cited references comprises a filtered rejection type and a text corresponding to the filtered rejection type, for each filtered cited reference in the set of filtered cited references.

5. The method of claim 1, further comprising:
mapping a set of scope concepts to claims of the patent application;
generating a claim chart of claims from the patent application and the set of scope concepts; and
presenting, in the user interface, the claim chart with the unique keywords identified in the claims and scope concepts.

6. The method of claim 1, further comprising:
generating, for each reference in the reference set, a total number of times the reference is cited in office action documents against the patent application and identified additional patent applications, and
presenting, in the user interface, the total number of times the reference is cited.

7. The method of claim 6, wherein the references of the reference set are ranked by earliest office action date where a respective reference of the reference set was cited.

8. A patent management system comprising:
a network;
at least one patent database, accessible on the network, and storing data including a plurality of office action documents stored in the at least one database, and
a server, operatively connected to the network, wherein the server includes:
a processor, a memory, software operable on the processor to:

receive an identification for a patent application contained in the at least one patent database, the identification of the patent application provided by a user through a user interface;

automatically formulate a search query to search an index of the at least one patent database for references cited in office action documents for the patent application, wherein the search query is generated in a database readable language and formulated using automatic extraction of keywords included in at least one claim of the patent application, the index including a set of references cited in office action documents against a set of patent applications, and the index further indicating a rejection type for each respective reference in the set of references as cited against a respective patent application of the set of patent applications;

in response to receipt of results from the search query, add the references cited in office action documents for the patent application to a reference set;

automatically formulate a second search query as a function of the search query, the second search query querying the index using a subset of references of the reference set having a rejection type, wherein the second search query incorporates a real-time analysis of historical data patterns and trends associated with the rejection types, utilizing a mapping module configured to dynamically correlate specific rejection types with corresponding patent applications and prosecution outcomes through bidirectional data exchange with an analytics database that maintains temporal rejection pattern data;

issue the second search query against the index of the at least one patent database to return, as query results, additional patent applications with office action documents where the subset of references of the reference set have been cited based on the rejection type, wherein search parameters of the second search query are continuously updated and refined in real-time based on live data inputs and the historical data patterns stored in the analytics database through automated feedback loops between the mapping module and analytics database;

add references found in the office action documents for the additional patent applications to the reference set by automatically inserting an application number for each additional patent application of the additional patent applications associated with an office action document of the office action documents where a reference of the references is cited for the rejection type to a structured data record field for the patent application, wherein the structured data record field maintains relational linkages between rejection types and associated references;

perform a keyword analysis for the patent application and references in the reference set based on occurrences of the keywords in the patent application and references in the reference set;

identify, as unique keywords, keywords occurring uniquely in the patent application; and present, in the user interface, the unique keywords.

9. The system of claim 8, wherein the index further comprises text corresponding to the rejection type.

10. The system of claim 8, wherein the software is further operable on the processor to:
  filter the reference set by the rejection type, wherein filtering further comprises providing a reference set of filtered cited references.

11. The system of claim 10, wherein the reference set of filtered cited references comprises a filtered rejection type and a text corresponding to the filtered rejection type, for each filtered cited reference in the reference set of filtered cited references.

12. The system of claim 8, wherein the software is further operable on the processor to:
  map a set of scope concepts to claims of the patent application;
  generate a claim chart of claims from the patent application and the set of scope concepts; and
  present, in the user interface, the claim chart with the unique keywords identified in the claims and scope concepts.

13. The system of claim 8, wherein the software is further operable on the processor to:
  generate, for each reference in the reference set, a total number of times the reference is cited in office action documents against the patent application and identified additional patent applications, and
  present, in the user interface, the total number of times the reference is cited.

14. The system of claim 13, wherein the references of the reference set are ranked by earliest office action date where a respective reference of the reference set was cited.

15. At least one non-transitory computer readable medium including instructions for analyzing office action documents that when executed by at least one processor, cause the at least one processor to:
  receive an identification for a patent application contained in a patent database, the identification of the patent application provided by a user through a user interface;
  automatically formulate a search query to search an index of the patent database for references cited in office action documents for the patent application, wherein the search query is generated in a database readable language and formulated using automatic extraction of keywords included in at least one claim of the patent application, the index including a set of references cited in office action documents against a set of patent applications, and the index further indicating a rejection type for each respective reference in the set of references as cited against a respective patent application of the set of patent applications;
  in response to receipt of results from the search query, add the references cited in office action documents for the patent application to a reference set;
  automatically formulate a second search query as a function of the search query, the second search query querying the index using a subset of references of the reference set having a rejection type, wherein the second search query incorporates a real-time analysis of historical data patterns and trends associated with the rejection types, utilizing a mapping module configured to dynamically correlate specific rejection types with corresponding patent applications and prosecution outcomes through bidirectional data exchange with an analytics database that maintains temporal rejection pattern data;
  issue the second search query against the index of the patent database to return, as query results, additional patent applications with office action documents where the subset of references of the reference set have been cited based on the rejection type, wherein search parameters of the second search query are continuously updated and refined in real-time based on live data inputs and the historical data patterns stored in the analytics database through automated feedback loops between the mapping module and analytics database;
  add references found in the office action documents for the additional patent applications to the reference set by automatically inserting an application number for each additional patent application of the additional patent applications associated with an office action document of the office action documents where a reference of the references is cited for the rejection type to a structured data record field for the patent application, wherein the structured data record field maintains relational linkages between rejection types and associated references;
  perform a keyword analysis for the patent application and references in the reference set based on occurrences of the keywords in the patent application and references in the reference set;
  identify, as unique keywords, keywords occurring uniquely in the patent application; and
  present, in the user interface, the unique keywords.

16. The at least one non-transitory computer readable medium of claim 15, wherein the index further comprises text corresponding to the rejection type.

17. The at least one non-transitory computer readable medium of claim 15, further comprising instructions to:
  filter the reference set by the rejection type, wherein filtering further comprises providing a reference set of filtered cited references.

18. The at least one non-transitory computer readable medium of claim 17, wherein the reference set of filtered cited references comprises a filtered rejection type and a text corresponding to the filtered rejection type, for each filtered cited reference in the reference set of filtered cited references.

19. The at least one non-transitory computer readable medium of claim 15, further comprising instructions to:
  map a set of scope concepts to claims of the patent application;
  generate a claim chart of claims from the patent application and the set of scope concepts; and
  present, in the user interface, the claim chart with the unique keywords identified in the claims and scope concepts.

20. The at least one non-transitory computer readable medium of claim 15, further comprising instructions to:
  generate, for each reference in the reference set, a total number of times the reference is cited in office action documents against the patent application and identified additional patent applications, and
  present, in the user interface, the total number of times the reference is cited.

* * * * *